(12) United States Patent
Chen (10) Patent No.: US 9,002,664 B2
(45) Date of Patent: Apr. 7, 2015

(54) FLOW COUNTER

(75) Inventor: Huiqing Chen, Saitama (JP)

(73) Assignee: Enplas Corporation, Saitama (JP)

( * ) Notice: Subject to any disclaimer, the term of this patent is extended or adjusted under 35 U.S.C. 154(b) by 350 days.

(21) Appl. No.: 13/110,134

(22) Filed: May 18, 2011

(65) Prior Publication Data

US 2011/0288794 A1 Nov. 24, 2011

(30) Foreign Application Priority Data

May 19, 2010 (JP) ................................ 2010-115720

(51) Int. Cl.
| | | |
|---|---|---|
| *G01F 1/00* | (2006.01) | |
| *G01F 1/05* | (2006.01) | |
| *G01F 1/07* | (2006.01) | |
| *G01F 1/11* | (2006.01) | |
| *G01F 15/00* | (2006.01) | |
| *G01F 1/06* | (2006.01) | |
| *G01F 1/075* | (2006.01) | |

(Continued)

(52) U.S. Cl.
CPC ................ *G01F 1/065* (2013.01); *G01F 1/075* (2013.01); *G01F 1/103* (2013.01); *G01F 1/115* (2013.01); *G01F 15/063* (2013.01); *G01F 15/0755* (2013.01)

(58) Field of Classification Search
CPC .............. G01F 1/05; G01F 1/07; G01F 7/00; G01F 11/267; G01F 15/06; G01F 1/82; G01F 3/10; G01F 15/07; G01F 15/001
USPC .......................................................... 702/45
See application file for complete search history.

(56) References Cited

U.S. PATENT DOCUMENTS 3,423,019 A * 1/1969 Ham ...................... 235/144 MA
4,066,095 A * 1/1978 Massa ............................ 137/486

(Continued)

FOREIGN PATENT DOCUMENTS

DE      3340508 A1    11/1985
DE   10060198 A1 *  6/2002

(Continued)

OTHER PUBLICATIONS

Machine Translation from JPO of JP11-230811.*

(Continued)

*Primary Examiner* — Eliseo Ramos Feliciano
*Assistant Examiner* — Terence Stifter, Jr.
(74) *Attorney, Agent, or Firm* — Brundidge & Stanger, P.C.

(57) ABSTRACT

A flow counter capable of correctly checking an operating state of the flow counter and leakage and correctly indicating a total amount of flow by allowing the rotation of a pointer to be learned accurately in the form of numerical data. In this flow counter (1), rotation of a flow detection driving gear (5) is transmitted to a flow indication section (4) composed of a plurality of digit wheels (4*a*1 to 4*a*8) by a main gear train section (2). The rotation of the flow detection driving gear (5) is also transmitted to a first pointer (6) by a branch gear section (3) branched from the main gear train section (2). The first pointer (6) indicates the operating state of the flow detection driving gear (5). The flow indication section (4) indicates a total amount of flow. A rotation detection member, which is a component of a rotation sensor, is integrally rotatably mounted on a rotating shaft of the first pointer (6). An amount of rotation of the rotating shaft is electrically detected by a rotation sensor.

4 Claims, 12 Drawing Sheets

(51) Int. Cl.
*G01F 1/10* (2006.01)
*G01F 1/115* (2006.01)
*G01F 15/06* (2006.01)
*G01F 15/075* (2006.01)

(56) References Cited

U.S. PATENT DOCUMENTS

| | | | | |
|---|---|---|---|---|
| 4,211,025 | A | * | 7/1980 | Metz ............................... 40/495 |
| 6,098,456 | A | * | 8/2000 | Munck ............................ 73/275 |
| 6,502,468 | B1 | * | 1/2003 | Thornborough ........... 73/861.78 |
| 2008/0184791 | A1 | | 8/2008 | Crottie |
| 2009/0085756 | A1 | * | 4/2009 | Atassi ........................... 340/605 |

FOREIGN PATENT DOCUMENTS

| | | | |
|---|---|---|---|
| EP | 0439070 | A1 | 7/1991 |
| JP | 11-230811 | A | 8/1999 |
| JP | 11230811 | A * | 8/1999 |
| WO | 02088642 | A1 | 11/2002 |

OTHER PUBLICATIONS

Extended European Search Report for European Patent Application 1116708.5 European Patent Office, Sep. 16, 2011.

* cited by examiner

FLOW COUNTER

CROSS REFERENCE TO RELATED APPLICATIONS

The disclosure of Japanese Patent Application No. 2010-115720, filed on May 19, 2010, including the specification, drawings and abstract, is incorporated herein by reference in its entirety.

TECHNICAL FIELD

The present invention relates to a flow counter used to measure the amount of water usage on a water meter or the amount of gas usage on a gas meter.

BACKGROUND ART

For example, in a flow counter used to measure the amount of water usage on a water meter, an impeller arranged at some midpoint of a duct rotates when water flows through the duct and the rotation of the impeller is transmitted to a pilot or digit wheel via a plurality of gears. Accordingly, an operator can visually check usage conditions of water based on the rotation of the pilot or the rotation of the digit wheel.

Figure 1:
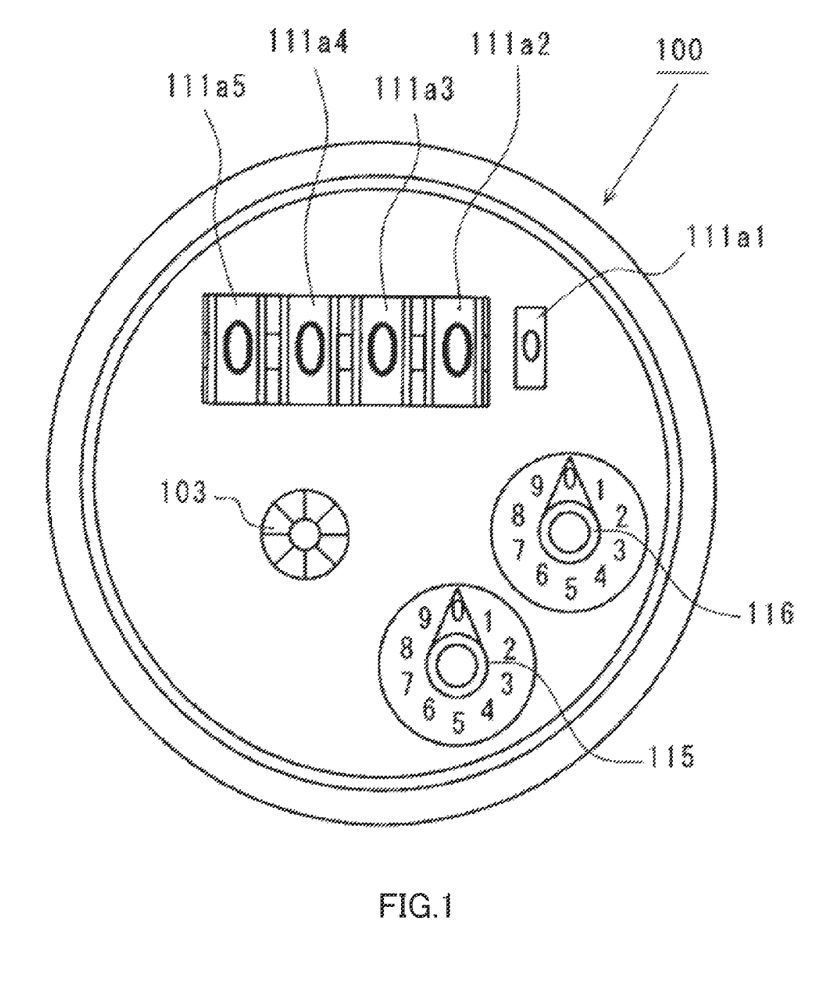
FIG. 1 is a plan view schematically showing a conventional flow counter.
Figure 2:
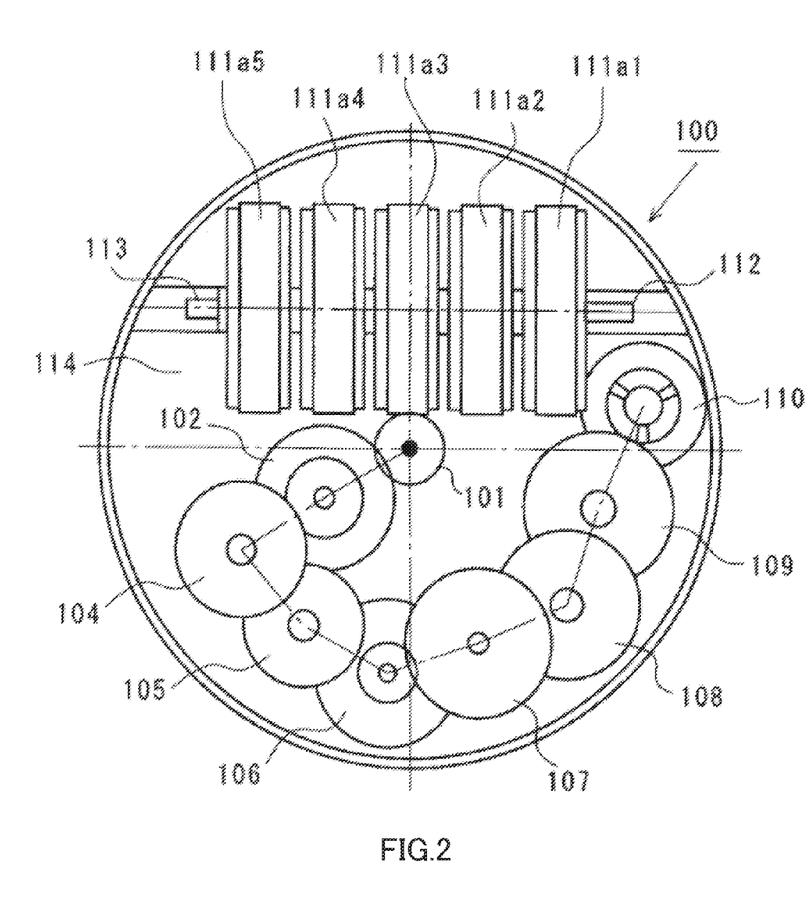
FIG. 2 is a plan view schematically showing an internal structure (mechanism) of the flow counter shown in FIG. 1.

FIGS. 1 and 2 are diagrams schematically showing such conventional flow counter 100. FIG. 1 is a plan view schematically showing conventional flow counter 100. FIG. 2 is a plan view schematically showing an internal structure (mechanism) of flow counter 100 in FIG. 1.

In flow counter 100 shown in these diagrams, the rotation of an impeller in a water pipe (not shown) is transmitted to driving gear 101 in a center section. The rotation of driving gear 101 is transmitted to pilot 103 via pilot gear 102. The rotation of pilot gear 102 is decelerated and transmitted via rotation to digit wheel 111a1 of the least significant digit via a plurality of gears 104 to 110 arranged consecutively. Digit wheels 111a1 to 111a5 are formed substantially in a disk shape. The numbers 0 to 9 are written on a circumferential surface of digit wheels 111a1 to 111a5 at regular intervals. Spindles 112 and 113 of digit wheels 111a1 to 111a5 are rotatably supported on the bottom plate 114 side. Flow counter 100 has five digit wheels 111a1 to 111a5 arranged therein to indicate the amount of water usage by numbers of the first digit to the fifth digit. If the digit wheel (111a1) of the lower-order digit between two adjacent digit wheels (111a1 and 111a2, for example) makes one rotation, the digit wheel (111a2) of the higher-order digit makes a ⅒ rotation (see patent literature 1). Gear 107 of the plurality of gears 104 to 110 consecutively arranged rotates first pointer 115 and gear 109 rotates second pointer 116.

CITATION LIST

Patent Literature

PTL 1
Japanese Patent Application Laid-Open No. 11-230811

SUMMARY OF INVENTION

Technical Problem

However, in conventional flow counter 100, the operator visually checks the rotation of pilot 103 to check the operating state of the flow counter 100 and to make measurement to check for water leakage and thus, the operating state of flow counter 100 and water leakage cannot be learned accurately in the form of numerical data.

It is therefore an object of the present invention to provide a flow counter that is capable of correctly checking the operating state of the flow counter and water leakage in the form of numerical data and correctly indicating a total amount of flow.

Solution to Problem

Flow counters 1 and 31 according to the present invention transmit, as shown in FIGS. 3 to 12, the rotation of flow detection driving gear 5 to pilot 9, pointer 6, and flow indication section 4 composed of a plurality of digit wheels 4a1 to 4a8 by a gear train. The operating state of flow detection driving gear 5 is indicated by pilot 9 and pointer 6 and the total amount of flow is indicated by flow indication section 4. In the present invention, the gear train includes main gear train sections 2 and 32 to transmit the rotation of flow detection driving gear 5 to pilot 9 and flow indication section 4 and branch gear sections 3 and 33 to transmit the rotation to pointer 6 by branching from main gear train sections 2 and 32. Rotation detection members 22 and 45, which are components of rotation sensor 21, are mounted on rotating shafts 18 and 41 of pointer 6 in such a way to be integrally rotatable. Then, the flow counters 1 and 31 according to the present invention electrically detect the amount of rotation of the rotating shafts 18 and 41 through the rotation sensor 21.

Flow counters 1 and 31 according to the present invention include, as shown in FIGS. 3 to 12, microcomputer 24 to calculate the amount of flow or the amount of leaked water based on detection results of rotation sensor 21. Then, microcomputer 24 causes display section 25 to display calculation results.

Advantageous Effects of Invention

According to the present invention, rotation axes of a pointer are driven to rotate by branch gear sections branched from a main gear train section and rotational resistance and running torque variations of a plurality of digit wheels will not directly act on the rotation axes of the pointer. Thus, the amount of rotation of rotation axes of the pointer can electrically be measured by a rotation sensor correctly. Therefore, according to the present invention, the amount of flow can correctly be calculated based on electric measurement results by a rotation sensor and the measurement results can be displayed on a display section such as a liquid crystal display panel in the form of numerical data.

Also according to the present invention, rotation axes of a pointer are driven to rotate by branch gear sections branched from a main gear train section and an influence such as rotational resistance of the rotation axes of the pointer and rotational irregularities generated in the rotation axes of the pointer over time will not directly act on a flow indication section composed of a plurality of digit wheels and thus, a total amount of flow can be indicated correctly by the flow indication section.

BRIEF DESCRIPTION OF DRAWINGS

FIG. 11 is a diagram schematically showing a rotation sensor according to Modification 2.

DESCRIPTION OF EMBODIMENTS

The embodiments of the present invention will be described below.

Embodiment 1

Figure 3:
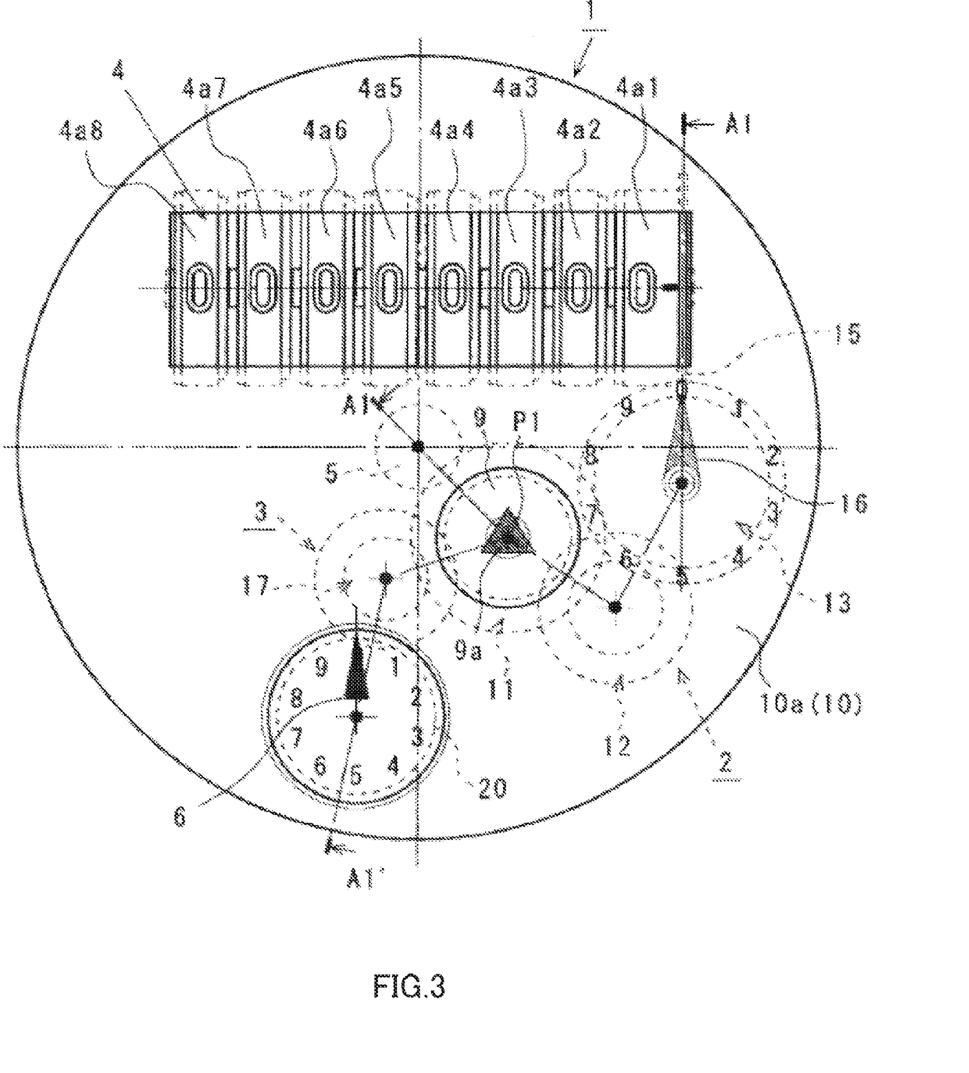
FIG. 3 is a plan view of the flow counter according to Embodiment 1 of the present invention.
Figure 4:
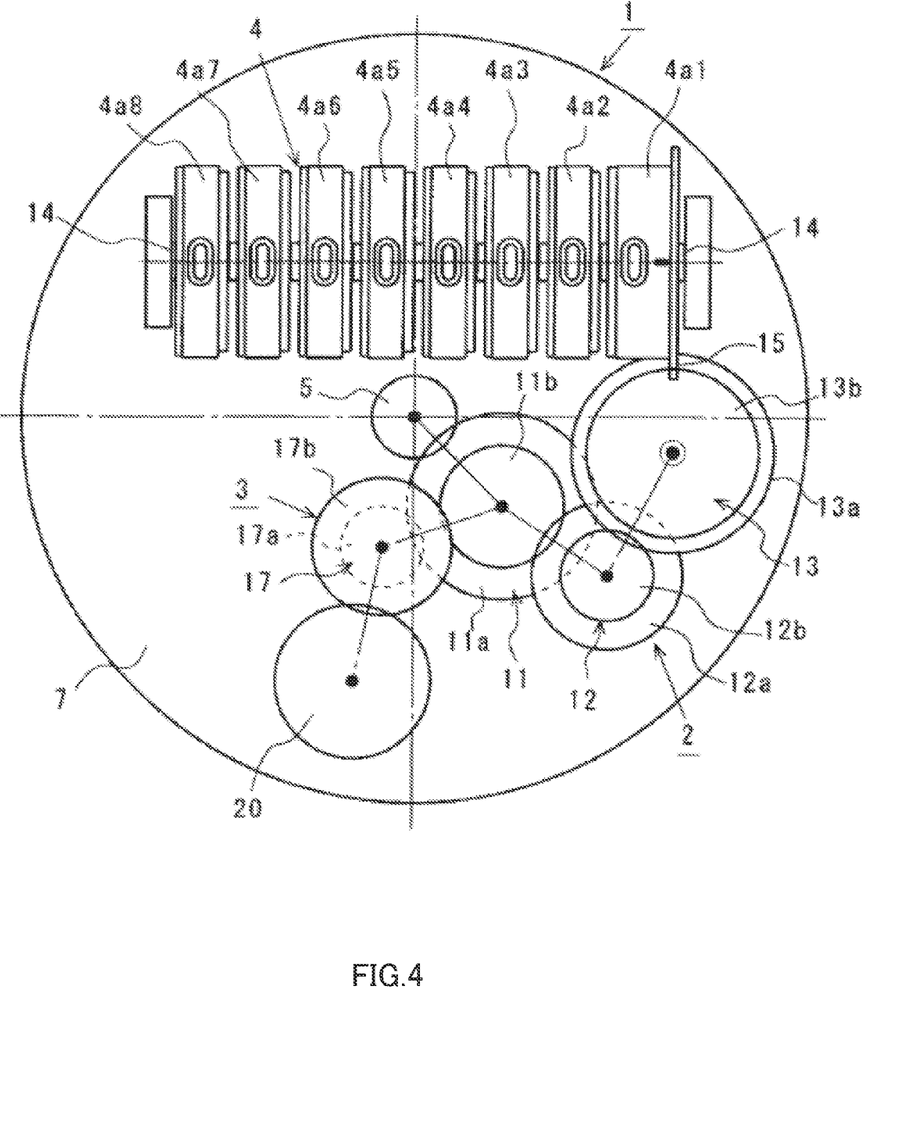
FIG. 4 is a plan view schematically showing the internal structure of the flow counter according to Embodiment 1 of the present invention.
Figure 5:
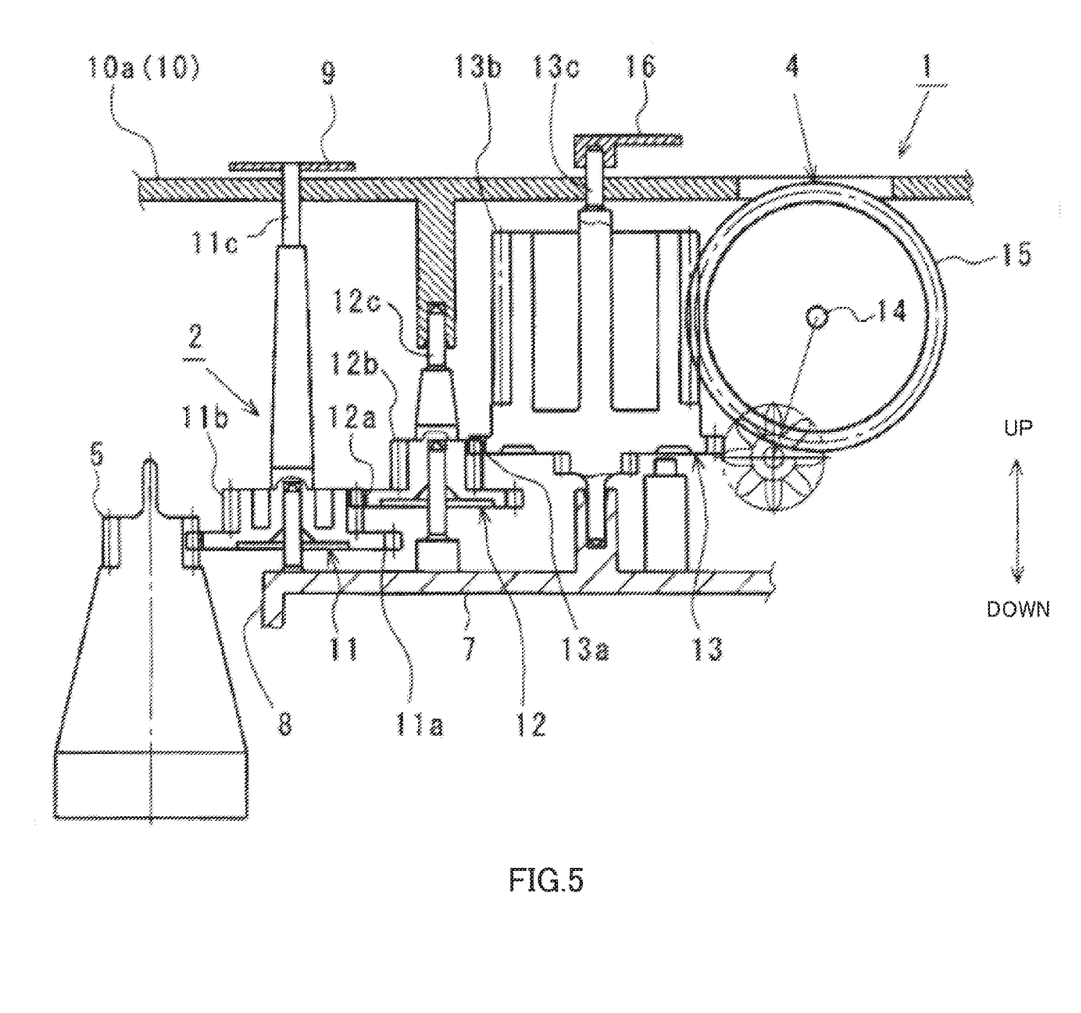
FIG. 5 is a partial sectional view (sectional view of the main gear train section side) of the flow counter shown by cutting along an A1-P1-A1 line in FIG. 3.
Figure 6:
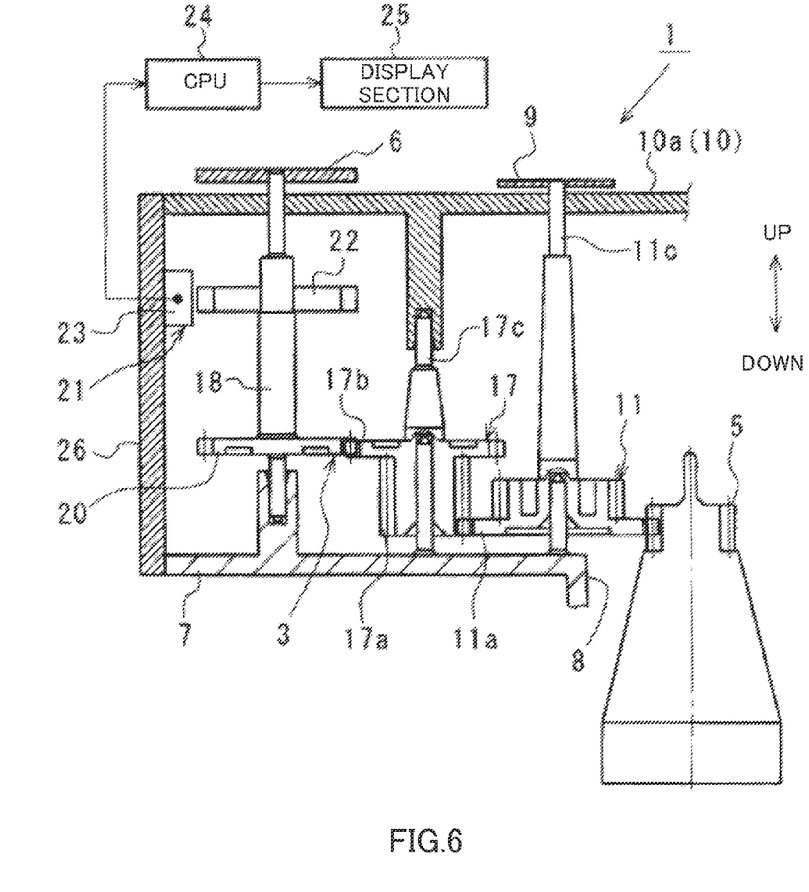
FIG. 6 is a partial sectional view (sectional view of the branch gear section side) of the flow counter shown by cutting along an A1-P1-A1' line in FIG.

FIGS. 3 to 6 are diagrams showing flow counter 1 according to Embodiment 1 of the present invention. FIG. 3 is a plan view of flow counter 1. FIG. 4 is a plan view schematically showing the internal structure of the flow counter. FIG. 5 is a partial sectional view (sectional view of the main gear train section 2 side) of flow counter 1 shown by cutting along the A1-P1-A1 line in FIG. 3. FIG. 6 is a partial sectional view (sectional view of the branch gear section 3 side) of flow counter 1 shown by cutting along the A1-P1-A1' line in FIG. 3.

Flow counter 1 shown in these diagrams constitutes flow indication section 4 of eight digit wheels 4a1 to 4a8 to indicate the total amount of water usage in eight digits. If the digit wheel (for example, 4a1) of the lower-order digit makes one rotation, the adjacent digit wheel of the higher-order digit (for example, 4a2) makes a 1/10 rotation. The rotation of flow detection driving gear 5 connected to an impeller inside a water pipe (not shown) is decelerated and transmitted to digit wheel 4a1 of the lowest-order digit via main gear train section 2. First pointer 6 is used to detect the accuracy of indication with flow indication section 4 or the amount of leaked water. The rotation of flow detection driving gear 5 is transmitted to first pointer 6 via branch gear section 3 branched from main gear train section 2.

Flow detection driving gear 5 is inserted between bottom plate 7 and top plate 10 through mounting hole 8 formed in the center of bottom plate 7 to rotate integrally with an impeller inside the water pipe (not shown). Bottom plate 7 and top plate 10 are arranged opposite to each other at a predetermined distance and integrated via a plurality of columns or side plates (not shown).

Main gear train section 2 is arranged between bottom plate 7 and top plate 10 and transmits the rotation of flow detection driving gear 5 to digit wheel 4a1 of the lowest-order digit. Main gear train section 2 is mainly composed of first double gear 11, second double gear 12, third double gear 13, and digit wheel driven gear 15.

First double gear 11 is driven to rotate by flow detection driving gear 5. Second double gear 12 is driven to rotate by first double gear 11. Third double gear 13 is driven to rotate by second double gear 12. Digit wheel driven gear 15 is mounted so as to be able to rotate integrally with rotating shaft 14 of digit wheel 4a1 of the lowest-order digit of flow indication section 4 and is driven to rotate by third double gear 13. Then, flow detection driving gear 5 and large-diameter gear 11a of first double gear 11 mesh with each other, small-diameter gear 11b of first double gear 11 and large-diameter gear 12a of second double gear 12 mesh with each other, small-diameter gear 12b of second double gear 12 and large-diameter gear 13a of third double gear 13 mesh with each other, and worm 13b of third double gear 13 and digit wheel driven gear 15 mesh with each other. As a result, the rotation of flow detection driving gear 5 is decelerated in three steps and transmitted to third double gear 13. An upper edge section of shaft 11c of first double gear 11 protrudes from top plate 10 to the side of surface 10a (upper surface side in FIG. 5) of top plate 10. Pilot 9 is fixed to the upper edge section of protruding shaft 11c. Pilot 9 is formed by printing triangular mark 9a in red on a disk formed of a resin material. The operator can detect the rotation or stop of flow detection driving gear 5 by visually checking triangular mark 9a. The upper edge section of shaft 13c of third double gear 13 also protrudes from top plate 10 to the side of surface 10a (upper surface side in FIG. 5) of top plate 10. Second pointer 16 is fixed to the upper edge section of protruding shaft 13c. Second pointer 16 rotates 10 times digit wheel 4a1 of the lowest-order digit and one rotation thereof corresponds to a 1/10 rotation of digit wheel 4a1 of the lowest-order digit. Second pointer 16 rotates on the surface 10a side of top plate 10 on the letters 0 to 9 printed around shaft 13c at regular intervals. First double gear 11 to third double gear 13 are formed so as to be able to rotate integrally with axes 11c to 13c respectively and are rotatably supported in both the bottom plate 7 side and the top plate 10 side.

Branch gear section 3 is arranged between bottom plate 7 and top plate 10 and is mainly composed of fourth double gear 17 and first pointer driven gear 20. Fourth double gear 17 is driven to rotate by first double gear 11 of main gear train section 2. First pointer driven gear 20 is mounted so as to be able to rotate integrally with rotating shaft 18 of first pointer 6 and is driven to rotate by fourth double gear 17. Large-diameter gear 11a of first double gear 11 and small-diameter gear 17a of fourth double gear 17 mesh with each other and large-diameter gear 17b of fourth double gear 17 and first pointer driven gear 20 mesh with each other. Fourth double gear 17 is formed so as to be able to rotate integrally with shaft 17c and is rotatably supported in both the bottom plate 7 side and the top plate 10 side. First pointer driven gear 20 is formed so as to be able to rotate integrally with rotating shaft 18 and is rotatably supported in both the bottom plate 7 side and the top plate 10 side. In the present embodiment, the rotation of flow detection driving gear 5 is transmitted to first pointer driven gear 20 via first double gear and fourth double gear 17 without being decelerated or accelerated, but the present invention is not limited to this and the rotation may be decelerated or accelerated and transmitted to first pointer driven gear 20 via first double gear 11 and fourth double gear 17.

First pointer 6 is integrally rotatably mounted on rotating shaft 18 rotatably supported by bottom plate 7 and top plate 10 and is arranged on the surface 10a side of top plate 10. First pointer 6 is formed by printing a needle-shaped mark on a disk formed of a transparent resin material and is fixed to the end of rotating shaft 18 projecting toward surface 10a of top plate 10. Numbers 0 to 9 are printed on surface 10a of top plate 10 around rotating shaft 18 at regular intervals. First pointer 6 rotates 10 times second pointer 16. One rotation of first pointer 6 corresponds to a 1/10 rotation of second pointer 16. That is, flow counter 1 according to the present embodiment indicates the amount of flow of the first and second decimal places of eight digits of flow indication section 4 by second pointer 16 and first pointer 6.

Magnetic gear 22 as a rotation detection member constituting rotation sensor 21 is mounted on rotating shaft 18 of first pointer 6. Magnetic gear 22 rotates integrally with rotating shaft 18 of first pointer 6. Semiconductor magneto-resistive element 23 is installed in a position opposite to magnetic gear 22 and rotation sensor (semiconductor rotation angle sensor) 21 is constituted of magnetic gear 22 and semiconductor magneto-resistive element 23. A predetermined power supply voltage (for example, 5 V, 6 V, or 8 V) is applied to rotation sensor 21. If magnetic gear 22 rotates, an external magnetic field changes (intensity) and internal resistance in semiconductor magneto-resistive element 23 changes and an output voltage of rotation sensor 21 changes in a sine curve. Then, changes in output voltage (electric detection signal) of rotation sensor 21 are input into microcomputer (CPU) 24 installed in flow counter 1. Microcomputer 24 calculates the number of rotations of rotating shaft 18 from a detection result (electric detection signal indicating the number of rotations of rotating shaft 18) of rotation sensor 21 and also calculates the amount of flow of water in the water pipe or the amount of leaked water from the calculation result to cause display section 25 such a liquid crystal panel to display the calculation result so that the operator can visually check as an image like numbers. Semiconductor magneto-resistive element 23 is mounted on side plate 26 and is supported by at least one of bottom plate 7 and top plate 10. In the present invention, microcomputer 24 may be installed between bottom plate 7 and top plate 10 of the flow counter and display section 25 may be installed on the surface 10a side of top plate 10. Also in the present invention, microcomputer 24 may be contained in an external mobile terminal or the like and display section 25 may be a liquid crystal display panel of the external mobile terminal. Also, microcomputer 24 and display section 25 may be installed on the side of a counter box (not shown) containing flow counter 1.

In flow counter 1 according to the present embodiment, as described above, if water flows inside a water pipe due to usage of water service or leakage while flow counter 1 being installed in the water pipe, an impeller inside the water pipe rotates and flow detection driving gear 5 rotates together with the impeller to start operation. The rotation of flow detection driving gear 5 is decelerated and transmitted to digit wheel 4a1 of the lowest-order digit via main gear train section 2, and the total amount of flow is indicated by eight digit wheels 4a1 to 4a8 of flow indication section 4. The rotation of flow detection driving gear 5 is transmitted to rotating shaft 18 of first pointer 6 via branch gear section 3 and the number of rotations of rotating shaft 18 of first pointer 6 is electrically detected by rotation sensor 21. Then, microcomputer 24 calculates the amount of flow or the amount of leaked water from the detection result and the calculation result is displayed on display section 25 such as a liquid crystal display panel.

By comparing the value of the measured amount of flow indicated by flow indication section 4 and a measurement result (a displayed result by display section 26) by rotation sensor 21, whether flow measurement is normally made in flow counter 1 can be checked when shipped from a factory or installed in a water pipe.

Flow counter 1 electrically detects the number of rotations of rotating shaft 18 of first pointer 6 by rotation sensor 21 accurately and calculates the amount of flow or the amount of leaked water by microcomputer 24 from the detection result to display the calculation result by display section 26 as an image like numerical data. Accordingly, the operator can correctly read the amount of leaked water.

In flow counter 1 according to the present embodiment, rotating shaft 18 of first pointer 6 is driven to rotate by branch gear section 3 branched from main gear train section 2 and rotational resistance and running torque variations of a plurality of digit wheels 4a1 to 4a8 will not directly act on rotating shaft 18 of first pointer 6. Thus, the amount of rotation of rotating shaft 18 of first pointer 6 can electrically be measured by rotation sensor 21 correctly. Therefore, according to flow counter 1 in the present embodiment, the amount of flow can correctly be calculated by microcomputer 24 based on a result of electric measurement by rotation sensor 21 and the calculation result can be displayed on display section 25 such as a liquid crystal display panel in the form of numerical data.

Also according to flow counter 1 in the present embodiment, rotating shaft 18 of first pointer 6 is driven to rotate by branch gear section 3 branched from main gear train section 2 and an influence such as rotational resistance of rotating shaft 18 of first pointer 6 and rotational irregularities generated in rotating shaft 18 of first pointer 6 over time will not directly act on flow indication section 4 composed of the plurality of digit wheels 4a1 to 4a8. Therefore, the total amount of flow can be indicated accurately by means of flow indication section 4.

Embodiment 2

Figure 7:
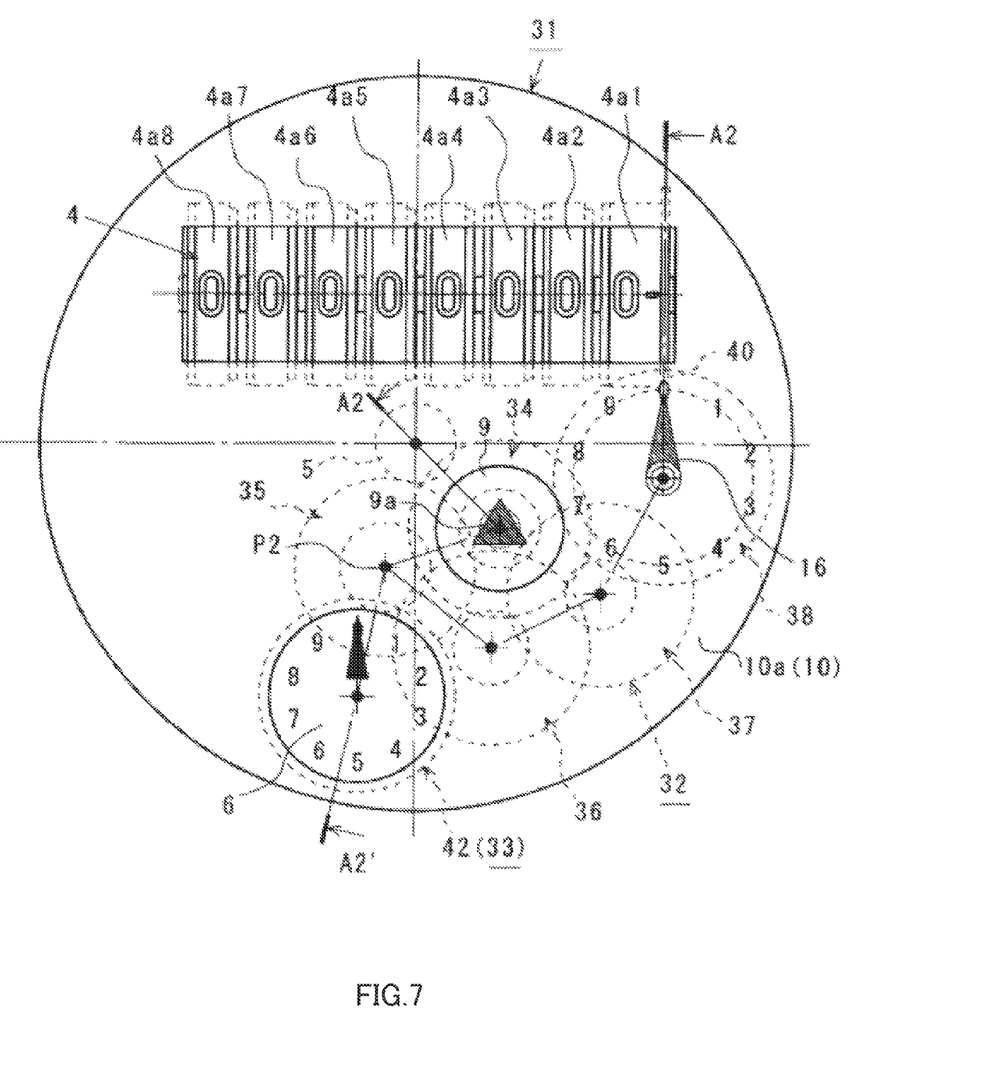
FIG. 7 is a plan view of the flow counter according to Embodiment 2 of the present invention.
Figure 8:
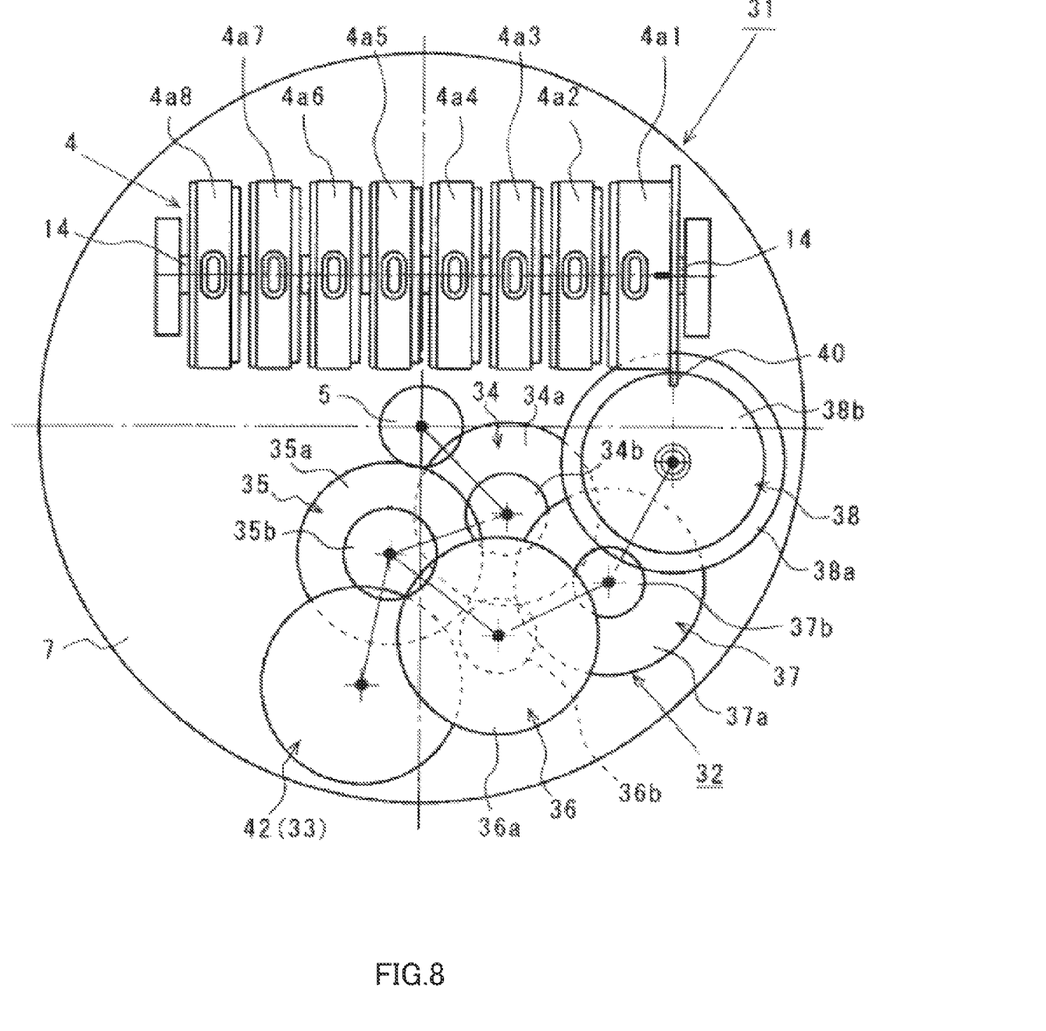
FIG. 8 is a plan view schematically showing the internal structure of the flow counter according to Embodiment 2 of the present invention.
Figure 9:
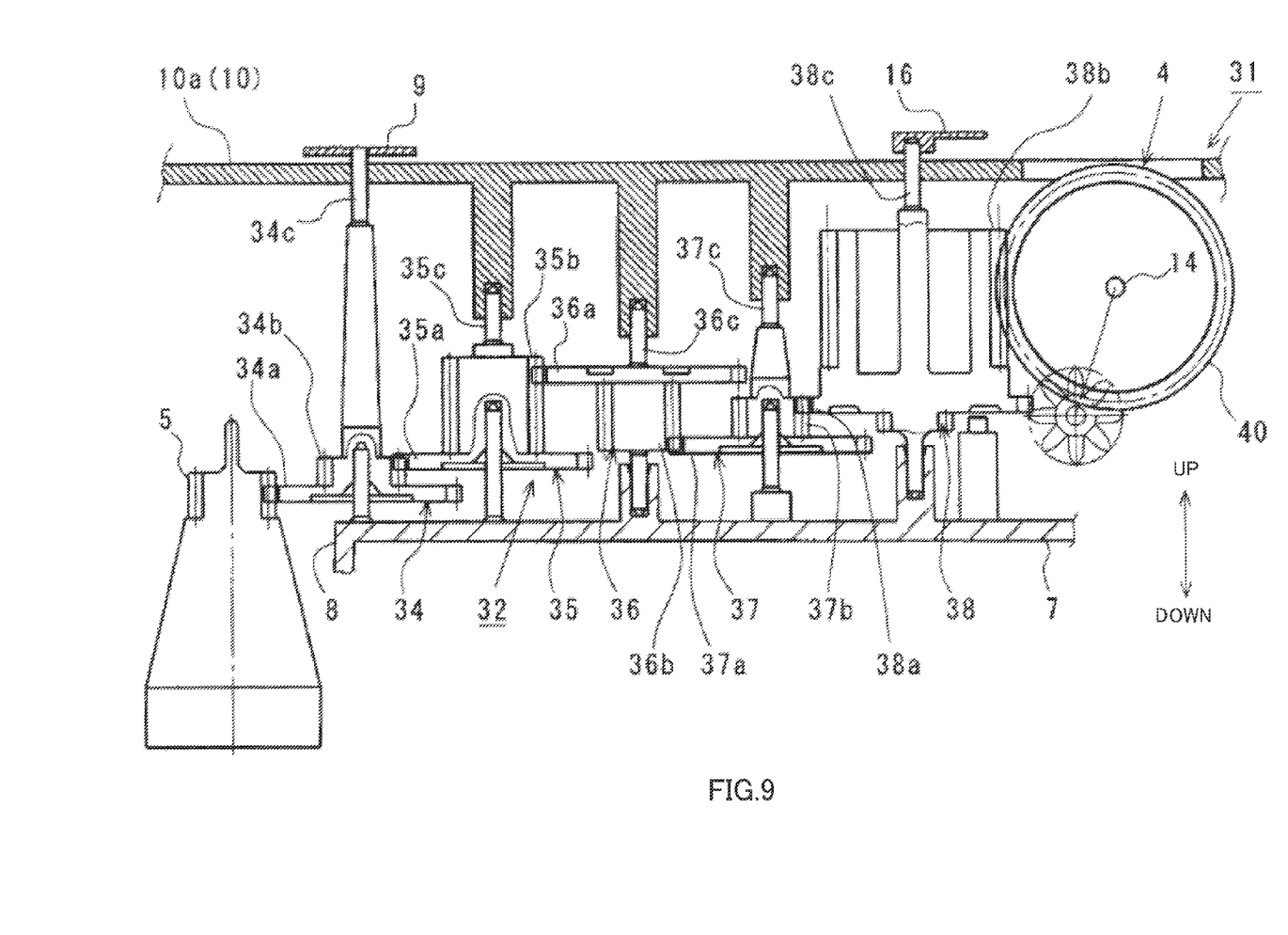
FIG. 9 is a partial sectional view (sectional view of the main gear train section side) of the flow counter shown by cutting along an A2-P2-A2 line in FIG. 7.
Figure 10:
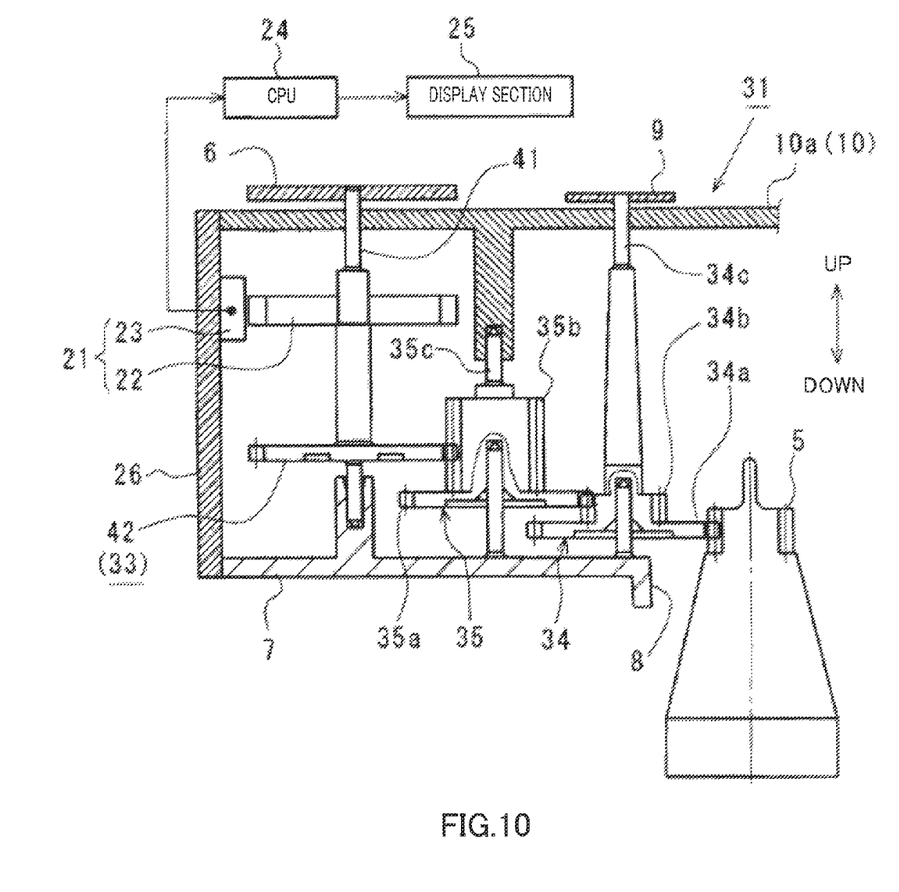
FIG. 10 is a partial sectional view (sectional view of the branch gear section side) of the flow counter shown by cutting along an A2-P2-A2' line in FIG. 7.

FIGS. 7 to 10 show flow counter 31 according to Embodiment 2 of the present invention. FIG. 7 is a plan view of flow counter 31. FIG. 8 is a plan view schematically showing the internal structure of flow counter 31. FIG. 9 is a partial sectional view (sectional view of main gear train section 32 side) of flow counter 31 shown by cutting along an A2-P2-A2 line in FIG. 7. FIG. 10 is a partial sectional view (sectional view of branch gear section 33 side) of flow counter 31 shown by cutting along an A2-P2-A2' line in FIG. 7.

Like flow counter 1 according to Embodiment 1, flow counter 31 shown in these diagrams constitutes flow indication section 4 of eight digit wheels 4a1 to 4a8. If the digit wheel (for example, 4a1) of the lower-order digit makes one rotation, the adjacent digit wheel of the higher-order digit (for example, 4a2) makes a 1/10 rotation. Flow counter 31 indicates the total amount of water usage in eight digits. The rotation of flow detection driving gear 5 connected to an impeller inside a water pipe (not shown) is decelerated and transmitted to digit wheel 4a1 of the lowest-order digit via main gear train section 32. First pointer 6 is used to detect the accuracy of indication with flow indication section 4 or the amount of leaked water. The rotation of flow detection driving gear 5 is transmitted to first pointer 6 via branch gear section 33 branched from main gear train section 32.

Flow detection driving gear 5 is inserted between bottom plate 7 and top plate 10 through mounting hole 8 formed in the center of bottom plate 7 to rotate integrally with an impeller inside the water pipe (not shown).

Main gear train section 32 is arranged between bottom plate 7 and top plate 10 and transmits the rotation of flow detection driving gear 5 to digit wheel 4a1 of the lowest-order digit. Main gear train section 32 is mainly composed of first double gear 34, second double gear 35, third double gear 36, fourth double gear 37, fifth double gear 38, and digit wheel driven gear 40. First double gear 34 is driven to rotate by flow detection driving gear 5. Second double gear 35 is driven to rotate by first double gear 34. Third double gear 36 is driven to rotate by second double gear 35. Fourth double gear 37 is driven to rotate by third double gear 36. Fifth double gear 38 is rotated by fourth double gear 37. Digit wheel driven gear 40 is mounted so as to be able to rotate integrally with rotating shaft 14 of digit wheel 4a1 of the lowest-order digit of flow indication section 4 and is driven to rotate by fifth double gear 38. Then, flow detection driving gear 5 and large-diameter gear 34a of first double gear 34 mesh with each other, small-diameter gear 34b of first double gear 34 and large-diameter gear 35a of second double gear 35 mesh with each other, small-diameter gear 35b of second double gear 35 and large-diameter gear 36a of third double gear 36 mesh with each other, small-diameter gear 36b of third double gear 36 and large-diameter gear 37a of fourth double gear 37 mesh with each other, small-diameter gear 37b of fourth double gear 37 and large-diameter gear 38a of fifth double gear 38 mesh with each other, and worm 38b of fifth double gear 38 and digit wheel driven gear 40 mesh with each other. As a result, the rotation of flow detection driving gear 5 is decelerated in five steps and transmitted to fifth double gear 38.

An upper edge section of shaft 34c of first double gear 34 projects toward surface 10a of top plate 10. Pilot 9 is fixed to the upper edge section of projecting shaft 34c. Pilot 9 is formed by printing triangular mark 9a in red on a disk formed of a resin material. The operator can detect the rotation or stop of flow detection driving gear 5 by visually checking triangular mark 9a. The upper edge section of shaft 38c of fifth double gear 38 also projects toward surface 10a of top plate 10. Second pointer 16 is fixed to the upper edge section of projecting shaft 38c. Second pointer 16 rotates 10 times digit wheel 4a1 of the lowest-order digit and one rotation thereof corresponds to a 1/10 rotation of digit wheel 4a1 of the lowest-order digit. Second pointer 16 rotates on the surface 10a side of top plate 10 and on the letters 0 to 9 printed around shaft 38c at regular intervals. First double gear 34 to fifth double gear 38 are formed so as to be able to rotate integrally with axes 34c to 38c respectively and are rotatably supported by the bottom plate 7 side and the top plate side 10 respectively.

Branch gear section 33 is arranged between bottom plate 7 and top plate 10 and is composed of first pointer driven gear 42 that can rotate integrally with rotating shaft 41 of first pointer 6. First pointer driven gear 42 meshes with small-diameter gear 35b of second double gear 35. Then, the rotation of flow detection driving gear 5 is transmitted to rotating shaft 41 via first double gear 34, second double gear 35, and first pointer driven gear 42. Rotating shaft 41 is rotatably supported in both the bottom plate 7 side and the top plate 10 side.

First pointer 6 is integrally rotatably mounted a the end of rotating shaft 41 projecting toward surface 10a of top plate 10 and is arranged on the surface 10a side of top plate 10. First pointer 6 is formed by printing a needle-shaped mark on a disk formed of a transparent resin material and is rotatable on numbers 0 to 9 printed on surface 10a of top plate 10. Numbers 0 to 9 are printed around rotating shaft 41 at regular intervals.

Magnetic gear 22 as a rotation detection member is mounted on rotating shaft 41 of first pointer 6 in flow counter 31 according to the present embodiment. The rotation sensor (semiconductor rotation angle sensor) 21 is the same as flow counter 1 according to Embodiment 1 in that it is constituted of magnetic gear 22 and semiconductor magneto-resistive element 23. A concrete configuration of rotation sensor 21 is the same as rotation sensor 21 described in Embodiment 1 and thus, a description thereof is omitted. Also, the relationship between rotation sensor 21 and microcomputer 24 and the relationship between microcomputer 24 and display section 25 are the same as those in Embodiment 1 and thus, a description thereof is omitted.

As described above, in flow counter 31 according to the present embodiment, if water flows inside a water pipe due to usage of water service or leakage when flow counter 1 is installed in the water pipe, the impeller inside the water pipe rotates and flow detection driving gear 5 rotates together with the impeller to start operation. The rotation of flow detection driving gear 5 is decelerated and transmitted to digit wheel 4a1 of the lowest-order digit via main gear train section 32, and the total amount of flow is indicated by eight digit wheels 4a1 to 4a8 of flow indication section 4. At these points, flow counter 31 according to the present embodiment is common to flow counter 1 according to Embodiment 1. However, compared with flow counter 1 according to Embodiment 1, the rotation of flow detection driving gear 5 is decelerated significantly and transmitted to digit wheel 4a1 of the lowest-order digit, in flow counter 31 according to the present embodiment.

Also in flow counter 31 according to the present embodiment, the rotation of flow detection driving gear 5 is transmitted to rotating shaft 41 of first pointer 6 via branch gear section 33 and the number of rotations of rotating shaft 41 of first pointer 6 is electrically detected by rotation sensor 21. Microcomputer 24 calculates the amount of flow or the amount of leaked water in the water pipe from the detection result and causes display section 25 such as a liquid crystal display panel to display the calculation result as an image like numbers so that the operator can visually check.

Compared with flow counter 1 according to Embodiment 1, flow counter 31 according to the present embodiment can decelerate the rotation of flow detection driving gear 5 significantly by main gear train section 32, and transmit the result to digit wheel 4a1 of the lowest-order digit, and thus it is possible to measure a larger amount of flow than by flow counter 1 according to Embodiment 1.

The inter-shaft distance between flow detection driving gear 5 and first double gear 34 in flow counter 31 according to the present embodiment, the inter-shaft distance between first double gear 34 and second double gear 35, and the inter-shaft distance between second double gear 35 and first pointer driven gear 42 are the same as the inter-shaft distance between flow detection driving gear 5 and first double gear 11 in flow counter 1 according to Embodiment 1, the inter-shaft distance between first double gear 11 and fourth double gear 17, and the inter-shaft distance between fourth double gear 17 and first pointer driven gear 20 respectively. Also, fifth double gear 38 in flow counter 31 according to the present embodiment and third double gear 13 in flow counter 1 according to Embodiment 1 are arranged in the same position. Then, third double gear 36 and fourth double gear 37 in flow counter 31 according to the present embodiment are arranged in positions that are different from positions in which any double gear in flow counter 1 according to Embodiment 1 is arranged. Therefore, by forming shaft-supporting sections of third double gear 36 and fourth double gear 37 of flow counter 31 in the present embodiment in bottom plate 7 and top plate 10 in flow counter 1 according to Embodiment 1 in advance, bottom plate 7 and top plate 10 in flow counter 1 according to Embodiment 1 can be used for flow counter 31 in the present embodiment. That is, flow counter 1 according to Embodiment 1 and flow counter 31 in the present embodiment can use components (bottom plate 7, top plate 10 and the like) in common.

Flow counter 31 according to the present embodiment can obtain the same effects as those of flow counter 1 according to Embodiment 1.

That is, by comparing the value of the measured amount of flow indicated by flow indication section 4 and a measurement result by rotation sensor 21 (a measurement result by display section 25), whether flow measurement is normally made in flow counter 31 according to the present embodiment can be checked when shipped from a factory or installed in a water pipe.

Also, flow counter 31 according to the present embodiment electrically detects the number of rotations of rotating shaft 41 of first pointer 6 accurately by rotation sensor 21 and calculates the amount of flow or the amount of leaked water by microcomputer 24 from the detection result so that the calculation result can be displayed on display section 25 as an image like numerical values. Thus, the operator can grasp the amount of flow or the amount of leaked water correctly.

Also, in flow counter 31 according to the present embodiment, first pointer 6 and rotating shaft 41 thereof are independently driven to rotate by branch gear section 33 branched from main gear train section 32 and rotational resistance and running torque variations of the digit wheels 4a1 to 4a8 will not directly act on rotating shaft 41. Therefore, rotational resistance and running torque variations acting on rotating shaft 41 can be reduced so that the rotation angle and the number of rotations of rotating shaft 41 can electrically be detected correctly.

Also, according to flow counter 31 in the present embodiment, rotating shaft 41 of first pointer 6 is driven to rotate by branch gear section 3 branched from main gear train section 2 and an influence such as rotational resistance of rotating shaft 41 of first pointer 6 and rotational irregularities generated in rotating shaft 41 of first pointer 6 over time will not directly act on flow indication section 4 composed of the plurality of digit wheels 4a1 to 4a8. Therefore, the total amount of flow can be indicated accurately by means of flow indication section 4.

(Modification 1)

In flow counters 1 and 31 in the above embodiments, rotation sensor 21 is exemplified by a semiconductor rotation angle sensor, but is not limited to such an example and any sensor capable of electrically measure the number of rotations of rotating shafts 18 and 41 of first pointer 6 can be used and, for example, a photoelectric rotation angle sensor may be used. In the photoelectric rotation angle sensor, a disk with spiral slits fixed to rotating shafts 18 and 41 is rotatably arranged between a light-emitting element and a semiconductor optical position detection element and when rotating shafts 18 and 41 rotate, light from the light-emitting element is shone on the semiconductor optical position detection element as a spot light so that the rotation angle of rotating shafts 18 and 41 is detected as changes in voltage.

(Modification 2)

Figure 11A:
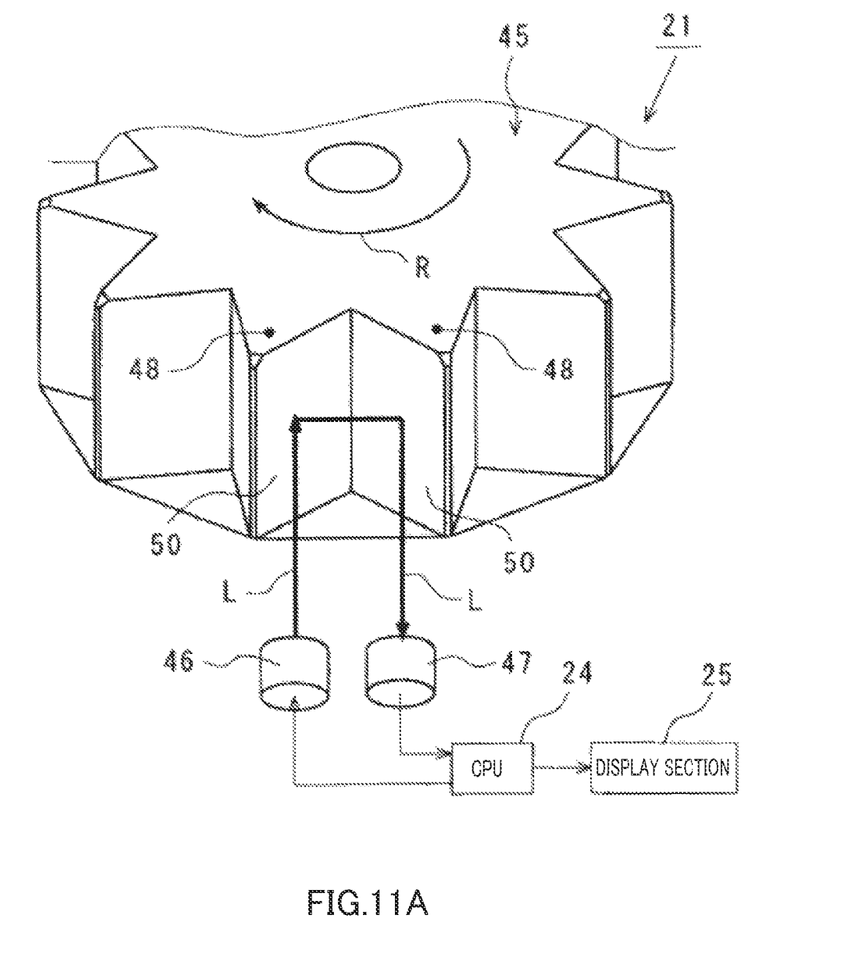
FIG. 11A is an appearance perspective view (perspective view when viewed from diagonally above) showing a portion of the rotation sensor.
Figure 11B:
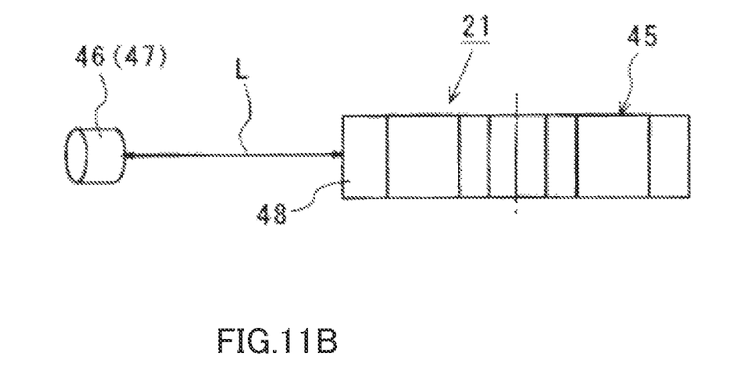
FIG. 11B is a side view showing the rotation sensor.

FIG. 11 shows modification 2 of rotation sensor 21. FIG. 11A is an appearance perspective view showing a portion of rotation sensor 21 (perspective view when viewed from diagonally above) and FIG. 11B is a side view showing rotation sensor 21.

Rotation sensor 21 shown in FIG. 11 is a photoelectric rotation sensor and includes reflecting rotor 45, light emitting section 46, and light receiving section 47. Instead of magnetic gear 22, reflecting rotor 45 is fixed to rotating shafts 18 and 41 of first pointer driven gears 20 and 42. Light emitting section emits laser light L toward reflecting rotor 45. Light receiving section 47 receives laser light L reflected by reflecting rotor 45.

Reflecting rotor 45 has a plurality (10) of triangular projections 48 along an outer circumference of a disk and has a substantial spur gear shape. Reflecting rotor 45 is formed of a resin material and has a light reflection film of a material (for example, silver or aluminum) superior in light reflection formed on the surface (particularly slopes 50 and 50) of triangular projections 48. Light emitting section 46 is subject to electrification control by microcomputer 24 and emission of laser light L is controlled by microcomputer 24. Light receiving section 47 is connected to microcomputer 24 via a photoelectric conversion device (not shown) and can output an electric signal in accordance with the amount of received light to microcomputer 24.

Thus, when laser light L is emitted from light emitting section 46 toward the side face (slope 50 of triangular projection 48) of reflecting rotor 45 rotating integrally with rotating shafts 18 and 41 of first pointer 6 in rotation sensor 21, laser light L is reflected by slope 50 of triangular projection 48 in the upstream in the rotation direction (R) and the reflected light is reflected by slope 50 of adjacent triangular projection 48 in the downstream in the rotation direction (R) before being received by light receiving section 47. As many reflection surface units composed of a pair of slopes 50 and 50 to reflect laser light L emitted from light emitting section 46 toward light receiving section 47 are formed by the same number of triangular projections 48. Therefore, according to rotation sensor 21 like this, the rotational speed of rotating shafts 18 and 41 can be calculated from a light-receiving time (output signal from light receiving section 47) of each reflection surface unit by microcomputer 24.

Light emitting section 46 and light receiving section 47 are installed on side plate 26 shown in FIGS. 6 and 10 or in a counter box (not shown) accommodating flow counters 1 and 31.

Figure 12A:
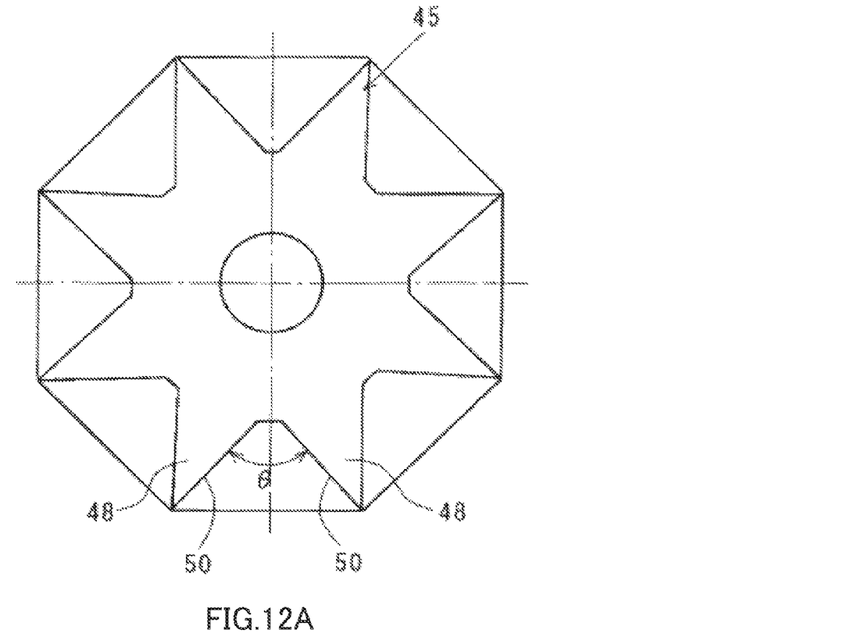
FIG. 12A is a plan view showing Modification 1 of a reflecting rotor.

Eight triangular projections 48 are formed and eight reflection surface units are formed. Reflecting rotor 45 is formed so that angle θ formed by a pair of slopes 50 and 50 constituting one reflection surface unit becomes 90°.

Figure 12B:
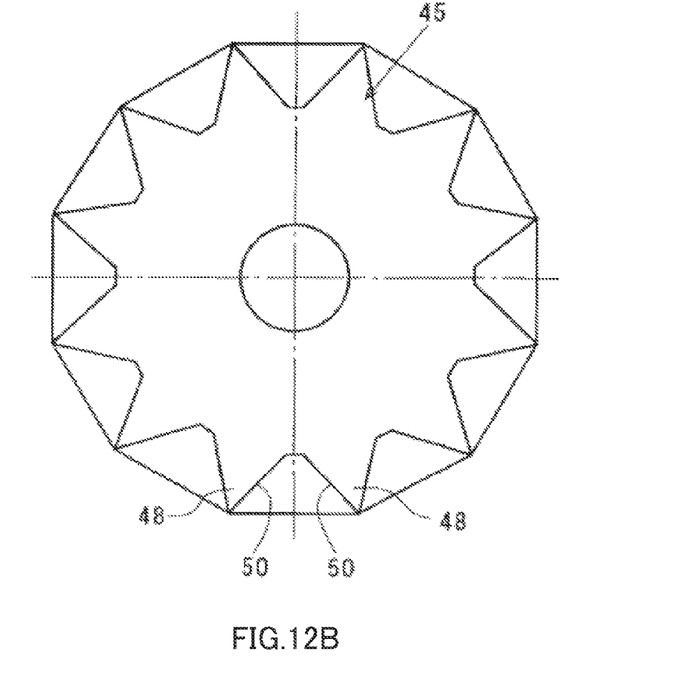
FIG. 12B is a plan view showing Modification 2 of the reflecting rotor.

FIG. 12B shows Modification 2 of reflecting rotor 45 in which 12 triangular projections 48 are formed and 12 reflection surface units composed of a pair of slopes 50 and 50 are formed.

As shown in FIGS. 11A, 12A, and 12B, reflecting rotor 45 sets the number of triangular projections 48 (that is, the number of reflection surface units) in accordance with the required level of accuracy of measurement (i.e. resolution).

In rotation sensor 21 described above, reflecting rotor 45 as a rotation detection member is fixed to rotating shafts 18 and 41 positioned at ends of branch gear sections 3 and 33. Thus, the layout of light emitting section 46 and light receiving section 47 becomes easier and light emitted from light emitting section 46 installed on side plate 26 or in the counter box reaches reflecting rotor 45 without being blocked by other components and light reflected by reflecting rotor 45 reaches light receiving section 47 without being blocked by other components.

(Modification 3)

Flow counters 1 and 31 in the above embodiments indicate the measured amount of flow in eight digits by eight digit wheels 4a1 to 4a8, but the present invention is not limited to this and depending on usage conditions, the amount of flow may be indicated by a smaller number of digit wheels or a larger number of digit wheels.

INDUSTRIAL APPLICABILITY

A flow counter according to the present invention is not limited to the application of a water meter to measure the amount of flow in water service and the amount of leaked water and can also be applied to measurement of the amount of flow of various liquids or measurement of the amount of flow of gases.

REFERENCE SIGNS LIST

1, 31 Flow counter
2, 32 Main gear train section (gear train)
3, 33 Branch gear section (gear train)
4 Flow indication section
4a1 to 4a8 Digit wheel
5 Flow detection driving gear
6 First pointer (pointer)
9 Pilot
18, 41 Rotating shaft
21 Rotation sensor
22 Magnetic gear (rotation detection member)
24 Microcomputer
25 Display section
45 Reflecting rotor (rotation detection member)

The invention claimed is:

1. A flow counter that transmits rotation of a flow detection driving gear to a pilot, a first pointer, and a flow indication section comprising a plurality of digit wheels, by means of a gear train, to indicate an operating state of the flow detection driving gear by the pilot and the first pointer and to indicate a total amount of flow by the flow indication section, wherein the gear train comprises:
a main gear train section that comprises a plurality of gears arranged consecutively from the flow detection driving gear to the digit wheel of the flow indication section and transmits the rotation of the flow detection driving gear to the pilot and the flow indication section;
a branch gear section that comprises at least one arranged gear which is branched from a predetermined gear of the main gear train section and transmits the rotation of the flow detection driving gear to the first pointer; and
a rotation sensor comprising a rotation detection member;
wherein the pilot is fixed to a shaft of one of the plurality of gears, which is a component of the main gear train section;
wherein the at least one arranged gear is mounted to rotate integrally with a rotating shaft of the first pointer;
wherein the rotation detection member is integrally rotatably mounted on the rotating shaft of the first pointer;
wherein an amount of the rotation of the rotating shaft is electrically detected by the rotation sensor; and
wherein the predetermined gear of the main gear train section and the flow detection driving gear mesh with each other.

2. The flow counter according to claim 1, further comprising a microcomputer that calculates the amount of flow or the amount of leaked water based on a detection result of the rotation sensor, wherein the microcomputer causes a display section to display a calculation result.

3. The flow counter according to claim 1, further comprising a second pointer that is fixed to a shaft of one of the plurality of gears, which is a component of the main gear train section, wherein
the main gear section transmits the rotation of the flow detection driving gear to the second pointer,
one rotation of the first pointer corresponds to a $\frac{1}{10}$ rotation of the second pointer, and
the first pointer and the second pointer indicates a first and second decimal of the amount of flow.

4. The flow counter according to claim 1, wherein the predetermined gear of the main gear train section and one gear of the at least one arranged gear separate from the main gear train section mesh with each other.

* * * * *